(12) United States Patent
Cooper (10) Patent No.: US 11,027,874 B2
(45) Date of Patent: Jun. 8, 2021

(54) LABELLING APPARATUS AND METHOD

(71) Applicant: Catchpoint Limited, Wetherby (GB)

(72) Inventor: Michael John Cooper, Wetherby (GB)

(73) Assignee: Catchpoint Limited, Wetherby (GB)

( * ) Notice: Subject to any disclaimer, the term of this patent is extended or adjusted under 35 U.S.C. 154(b) by 0 days.

(21) Appl. No.: 15/544,145

(22) PCT Filed: Jan. 18, 2016

(86) PCT No.: PCT/GB2016/050099
§ 371 (c)(1),
(2) Date: Jul. 17, 2017

(87) PCT Pub. No.: WO2016/113574
PCT Pub. Date: Jul. 21, 2016

(65) Prior Publication Data
US 2018/0009562 A1 Jan. 11, 2018

(30) Foreign Application Priority Data
Jan. 16, 2015 (GB) ..................................... 1500746

(51) Int. Cl.
*B65C 9/18* (2006.01)
*B29C 65/74* (2006.01)

(52) U.S. Cl.
CPC ............ *B65C 9/1869* (2013.01); *B65C 9/188* (2013.01); *B65C 9/1896* (2013.01);
(Continued)

(58) Field of Classification Search
CPC ..... B65C 9/1869; B65C 9/188; B65C 9/1896; B29C 2793/00; B29C 2793/0072; B29C 65/749
(Continued)

(56) References Cited

U.S. PATENT DOCUMENTS 3,169,895 A * 2/1965 Sohn Alleno ......... B65C 9/1869
156/361
4,153,496 A * 5/1979 Swift ..................... B31D 1/021
156/248
(Continued)

FOREIGN PATENT DOCUMENTS

DE 19853737 A1 5/2000
EP 3247645 A1 * 11/2017 ........... B65C 9/1896
(Continued)

OTHER PUBLICATIONS

Translation of DE19853737.*

*Primary Examiner* — Sonya M Sengupta
(74) *Attorney, Agent, or Firm* — GableGotwals (57) ABSTRACT

This invention relates to application of labels from a supply of labels which are defined in sheet material and in which adjacent labels are joined together by a line of weakening to form a continuous label supply. The label sheet material is provided with a layer of adhesive which contacts with a backing layer to form the label supply. The leading label is provided with a leading edge portion detached from the backing layer from application at an application point to an article and the article and label feed movement are controlled such that the remainder of the label can be detached from the backing layer, and the line of weakening broken effectively and accurately and without the need for the sheet material of the label supply and/or backing layer to have a thickness to provide the level of rigidity or stiffness of the material which is conventionally required, thereby reducing material usage and wastage.

23 Claims, 4 Drawing Sheets

(52) U.S. Cl.
CPC ........ *B29C 65/749* (2013.01); *B29C 2793/00* (2013.01); *B29C 2793/0072* (2013.01)

(58) Field of Classification Search
USPC .................................. 156/250, 260, 261, 267
See application file for complete search history.

(56) References Cited

U.S. PATENT DOCUMENTS

| | | | | |
|---|---|---|---|---|
| 4,978,415 | A * | 12/1990 | Jones | B65C 9/1819 156/256 |
| 6,024,830 | A * | 2/2000 | Nedblake | G09F 3/10 156/353 |
| 6,571,983 | B1 * | 6/2003 | Schumann | B26D 7/18 221/25 |
| 7,241,357 | B2 * | 7/2007 | Roth | B31D 1/021 156/227 |
| 8,540,003 | B2 * | 9/2013 | Cooper | B65C 9/1876 156/521 |
| 10,233,359 | B2 * | 3/2019 | Naik | B32B 27/308 |
| 2004/0026024 | A1 * | 2/2004 | Nakasaka | B65C 11/066 156/250 |
| 2007/0074809 | A1 * | 4/2007 | Phillips | B65C 9/1865 156/256 |
| 2008/0307686 | A1 * | 12/2008 | Wade | B65C 9/1896 40/638 |
| 2009/0092781 | A1 * | 4/2009 | Guzi | B32B 7/06 428/42.3 |
| 2013/0075028 | A1 * | 3/2013 | Fragnoli | B32B 38/145 156/250 |
| 2018/0009562 | A1 * | 1/2018 | Cooper | B65C 9/1869 |

FOREIGN PATENT DOCUMENTS

| | | | | |
|---|---|---|---|---|
| GB | 201500746 | * | 3/2015 | ............ B65C 9/188 |
| GB | 201706509 | * | 6/2017 | ............ B65C 9/188 |
| GB | 2546051 A | * | 7/2017 | ............ B65C 9/188 |
| WO | 2006077434 A2 | | 7/2006 | |
| WO | 2009136138 A1 | | 11/2009 | |
| WO | WO-2016113574 A1 | * | 7/2016 | ........... B65C 9/1869 |

* cited by examiner

LABELLING APPARATUS AND METHOD

CROSS-REFERENCE TO RELATED APPLICATIONS

This application is the United States National Phase of Patent Application No. PCT/GB2016/050099 filed 18 Jan. 2016, which claims priority to British Patent Application No. 1500746.1 filed 16 Jan. 2015, each of which are incorporated herein by reference.

BACKGROUND OF THE INVENTION

The invention to which this application relates is apparatus and a method which allows for the effective application of labels to one or more articles whilst, at the same time, allowing the amount of waste material which is required to be provided and then discarded, to be reduced.

Conventionally, labels of the pressure sensitive type, which are to be applied to articles are initially provided in a roll, or are formed at the application apparatus but, in either case, are provided on a backing layer from which the labels are removed and then applied to the article. The problem with this form of label supply is that the labels and/or backing layer are required to be formed of relatively thick sheet material in order to provide the required rigidity to the label during the application process in order to ensure that the label is accurately applied. This, in turn, means that relatively large volumes of the sheet material in which the labels are formed is used and/or excessive waste material is generated by the discarded backing layer sheet material. Furthermore, dispensing a label from the backing layer conventionally requires there to be a predefined stiffness in the backing layer material in order to overcome the surface tension on the label adhesive and the release values of the, typically silicone coated, backing material. This conventionally results in the lower limit in the thickness, both for technical and commercial reasons, of the PET or PP backing layer thickness to need to be more than 20 microns and the label material thickness to be 50 microns or more, and it is found that this label and backing layer combination cannot be successfully applied using many standard application apparatus. Also, ideally, as end users do not want to have to deal with the waste material in the form of the backing layer material the possibility of using alternative decoration methods like sleeving and direct printing are viewed as attractive propositions.

The provision of a relatively thin backing layer would allow a reduced material content and would improve the convenience of collection of waste material for recycling, with PET type materials offering a recovered value. Conventional label application systems use nip drives to control the movement of liners and if thinner materials are used this control becomes more challenging and frequently affects label placement accuracy.

The aim of the present invention is therefore to provide a method and apparatus which allows the application of labels from a backing material onto an article to be achieved reliably whilst, at the same time, minimising the thickness of the label and/or backing sheet material which is required to be used. A further aim is to allow the application of the labels to be achieved reliably at speeds which allow the same to be used commercially in relatively high speed application apparatus.

In a first aspect of the invention there is provided a method for the automated application of labels successively from a backing layer onto successive articles, said method comprising feeding a supply of labels defined by a first sheet material, which is adhered to the backing layer of sheet material, towards an application point, said labels in said supply of labels joined to adjacent labels in the supply by a line of weakening such that a first, leading, label is connected to a following label by a line of weakening, wherein the backing layer is detached from a leading portion of the leading label and said portion is applied to an article and the strength of the line of weakening is provided to be such that the line of weakening remains intact until the remainder of the leading label is released from the backing layer.

Typically, as the leading label is released from the backing layer the same is applied to the article.

In one embodiment the retention strength of the line of weakening between adjacent labels in the label supply is greater than the strength of the attachment of the adhesive of the label supply sheet material to the backing layer.

In one embodiment the force required to break the line of weakening is greater than the force required to detach the label supply from the backing layer.

In one embodiment the strength of the line of weakening is less than the straight line shear force of the label following the leading label.

Typically, the supply of labels passes an application beak which is offset from the application point between the leading edge of the leading label and the said article.

In one embodiment the offset is in the range of a length of 5-25 mm from the leading edge of a predispensed portion of the leading label from the application point or high point of the article to which the label is to be applied.

In one embodiment, guide means are provided which allow the supply of labels to be retained in position with respect to the linear movement of the supply of labels.

In one embodiment the speed of application of the labels is defined by the speed of movement of the articles to which the labels are applied and the speed of feed of the supply of labels is adjusted during the label application cycle in order to encourage the release of the leading label from the supply of labels and the break of the line of weakening.

In one embodiment the release of the leading label is assisted by the deflection of the same from the path of the direction of feed of the label supply and the deflection is caused by the contact of the leading portion of the label with the article and the movement of the portion of the leading label with the article. This deflection assists release as the feed of the label is initiated.

In one embodiment the leading edge of the leading label contacts the article to adhere to the same as the speed of movement of the supply of labels is reduced. In one embodiment the reduction in the speed of movement is such as to cause the movement of the supply of labels to be temporally stopped to create sufficient tension in the label supply to cause the line of weakening between the leading label and the following label to break and release the leading label for full application to the article.

In one embodiment the released label is then applied fully to the article by continued movement of the article. In an alternative embodiment the article and partially applied label are moved to a further station of the apparatus at which the label can then be fully applied.

Typically at least the article is moved continuously during the label application stage. Typically the movement of the label supply is controlled such as to allow the tension to be created which is sufficient to break the line of weakening once the leading label is brought into contact with the article and the leading edge of the following label is released to the defined distance.

In one embodiment the label feed is held stationery at the stage of attachment of the portion of the leading label with the article.

In an alternative embodiment the label feed is fed under positive control at the stage of attachment of the portion of the leading label with the article.

The movement of the subsequently freed leading edge of the following label is brought to the application point by the subsequent movement of the supply of labels and/or initial contact with the article to which it is to be applied, to allow the same to be applied to the next article and the application cycle repeated.

The provision of the method of the form described allows relatively thin backing layer and/or label sheet to be used as the need for stiffness of the label material during the application to the article is reduced.

In one embodiment the feeding of the label supply can be pulled forward by a nip drive.

In another embodiment the label feed supply is pushed towards the application point by one or more drive belts following the attachment of the leading edge of the label to the first article to which the leading label of the label supply is to be applied. In this case the removal of the backing layer can be delayed without any effect on the accuracy of application.

Typically the liner or backing layer of the label supply is removed from the leading label prior to the leading label separation being achieved.

In one embodiment a nip roller is provided to cause the leading edge of the leading label and the article to be pressed together in order to improve the contact of the leading edge to the article and create a "hump" or loop of the supply of labels which allows a snap force to be created to cause the line of weakening to break. Typically, the movement of the label supply is initiated or changed before the leading edge of the label and the container are pressed together by the press down roller.

In one embodiment an ionised air flow is directed onto the supply of labels and/or apparatus adjacent thereto in order to reduce static build up.

Typically the size and strength of the line of weakening which is created between adjacent labels in the supply of labels is dependent upon one or more parameters such as the position of the line of weakening on the label, the shape of the label, the thickness of material in which the labels are formed.

In one embodiment a vacuum is created at the point of application in order to assist in the separation of the leading label from the supply of labels as it is applied to the article. In one embodiment this is created with respect to a belt on which the supply of labels is located or alternatively a drum can be provided.

In one embodiment, when the apparatus includes a drum, the same is mounted for rotation and the leading label can be applied from the drum to the article, with the article caused to rotate about an axis and thereby draw the label into adherence with the same and around at least part of the periphery of the article wall.

In a further aspect of the invention there is provided a method for the automated application of labels successively from a backing layer onto successive articles, said method comprising feeding a supply of labels defined by a first sheet material in which the labels are formed and which is adhered to the backing layer, towards an application point, said supply of labels having a first, leading, label connected to a following label by a line of weakening and wherein the method includes the step of removing a leading portion of the leading label from the backing layer and advancing the said removed leading portion to an application point to contact and adhere to the article and thereafter removing the remainder of the leading label from the backing layer and breaking the line of weakening to detach the leading label from the label supply.

In one embodiment the method includes the steps of moving the article past the application point and said movement, in combination with the controlled movement of the supply of labels allowing the detachment of the leading label and application to the article.

In one embodiment the movement of the article is at a substantially continuous speed and the movement of the supply of labels is changed during the application cycle for the label.

In a yet further aspect there is provided apparatus for the application of labels to articles, said apparatus including feed means to feed a label supply comprising sheet material in which the labels are formed, a layer of adhesive and a backing layer, with adjacent labels joined together by a line of weakening, said labels fed towards an application point of a leading label from the label supply to one of said articles, separation means to allow the label sheet material to be separated from the backing layer material and wherein a leading portion of the leading label of the sheet material is separated from the backing layer so as to expose adhesive on said portion for contact with the said article, said portion located in advance of the separation means, and control means are provided for control of the speed of feed of the label supply and control means are provided to control the speed of movement of the article past the application point, such that contact and adherence of said label portion with the article and the control of the movement of the feed of the label supply, allow the remainder of the leading label to be applied to the article and the line of weakening broken to allow the leading label to be detached from the supply of labels.

In one embodiment the feed means engage with the label supply to move the same.

In one embodiment the separation means include a beak or point about which the backing layer material passes.

In one embodiment the separation means includes a pressing means which acts to press the leading label onto the article whilst the leading label is still in contact with the label supply.

In one embodiment the drive means includes means to physically engage with the label supply to move the same, possibly though apertures provided in the label supply and a sprocket drive which engages with the same to move the label supply.

In one embodiment a vacuum effect is created at or adjacent to the application point for the leading label to the article.

Specific embodiments of the invention are now described with reference to the accompanying drawings; wherein.

Figure 1:
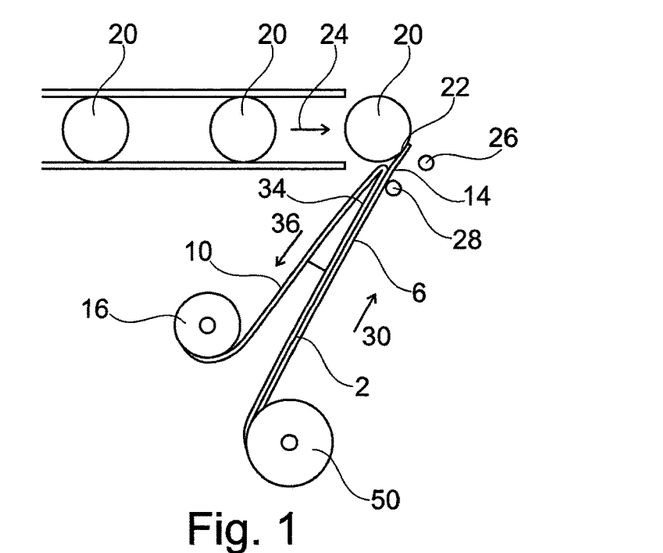
FIG. 1 illustrates, schematically, apparatus in accordance with one embodiment of the invention in plan.
Figure 4:
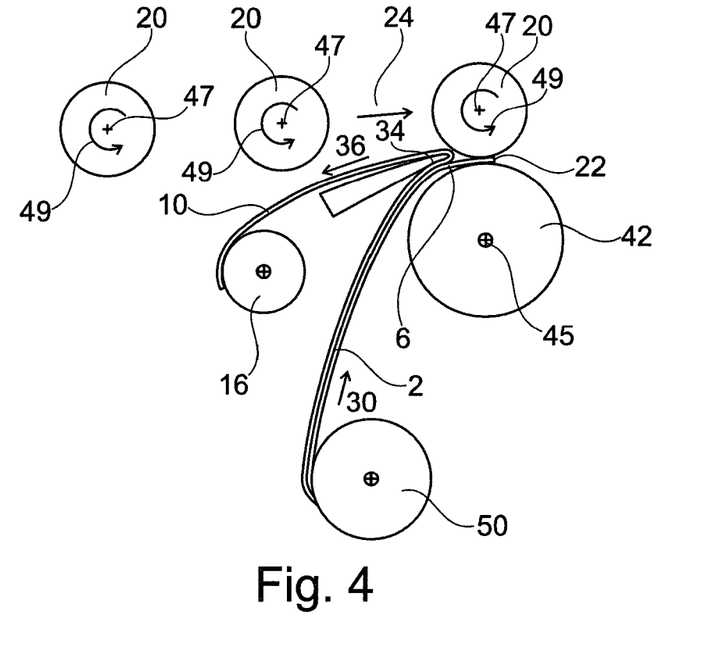
FIG. 4 illustrates schematically apparatus in accordance with a second embodiment of the invention.

With reference to the drawings, the method and apparatus of the invention of the embodiments of FIGS. 1 and 4, allows a supply of labels 2, in this case shown as being fed from a label supply roll 50, to be moved to an application point 22 to allow the leading label 8' and following labels 8 defined on the sheet material layer 6 of the supply of labels 2 to be successively applied to articles 20.

Figure 2A:
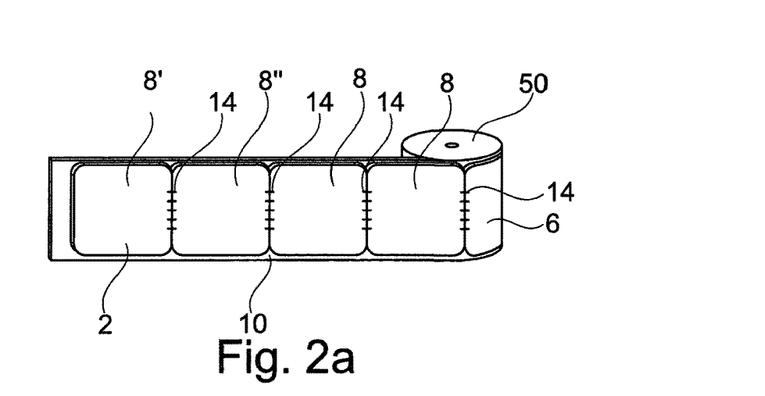
FIGS. 2*a* and *b* illustrates a supply of labels and an article to which a label is applied in accordance with one embodiment of the invention.
Figure 2B:
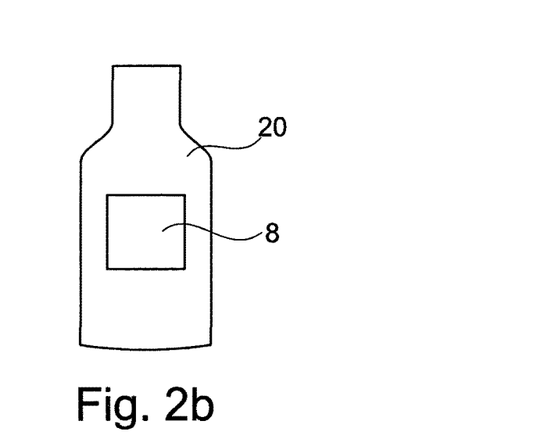

The supply of labels 2 as shown in FIG. 2a, comprises a sheet material 6 in which the labels 8 are defined and a backing layer 10 on which the sheet material 6 is adhered by a layer of adhesive (not shown) carried on the under surface of the sheet material layer 6. The adhesive is used to adhere the labels to the article 20 as shown in FIG. 2b. A release layer, typically of silicone, is provided on the face of the backing layer 10 on which the adhesive of the sheet material 6 is applied to allow the subsequent removal of the labels defined in the sheet material 6 from the backing layer at the application point 22. The labels 8 are connected to respective adjacent labels via lines of weakening 14, with the force required to remove the leading label from the backing layer 10 being less than the force required to break the line of weakening 14, to thereby ensure that the line of weakening remains intact during at least the initial stages of the application of the leading label to the article 20. The outline of the label shape is also defined in the sheet material, typically prior to the label supply being provided to the application apparatus so that no further shape or line of weakening formation is required at the application apparatus.

In FIGS. 1 and 3a-c the supply of labels is moved such that the leading label 8' is moved to an application point 22 at which at least the portion of adhesive underlying the leading portion and edge 32 of the leading label 8' is exposed from the backing layer 10. The exposed portion 32 of the label is contacted by an article 20, typically in the form of a container, which is moving and continues to move at a predetermined speed indicated by arrow 24.

Figure 3A:
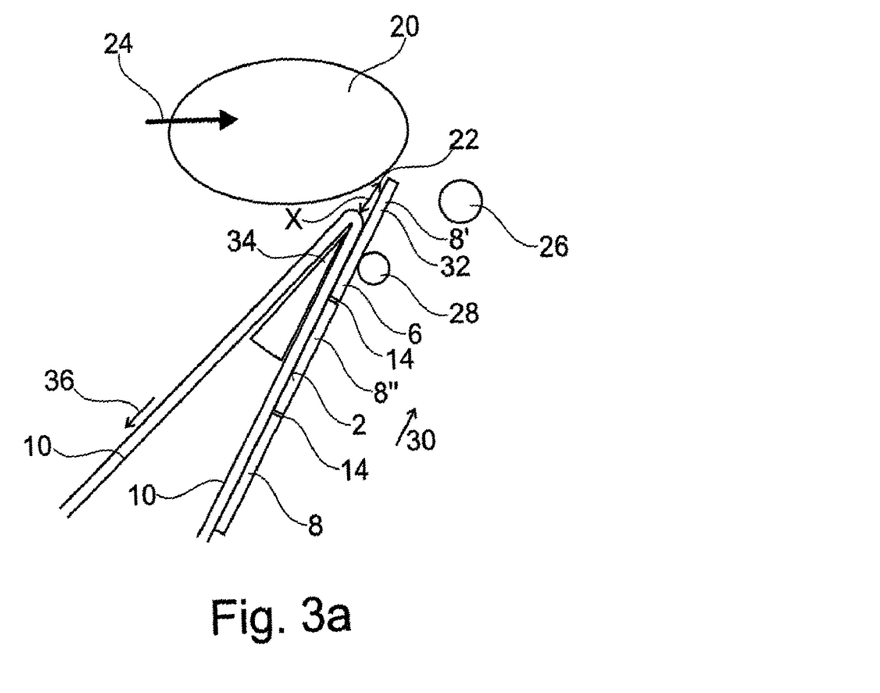
FIGS. 3*a-d* illustrate the application steps for a leading label from a label supply utilising the apparatus of the embodiment of FIG. 1.
Figure 3B:
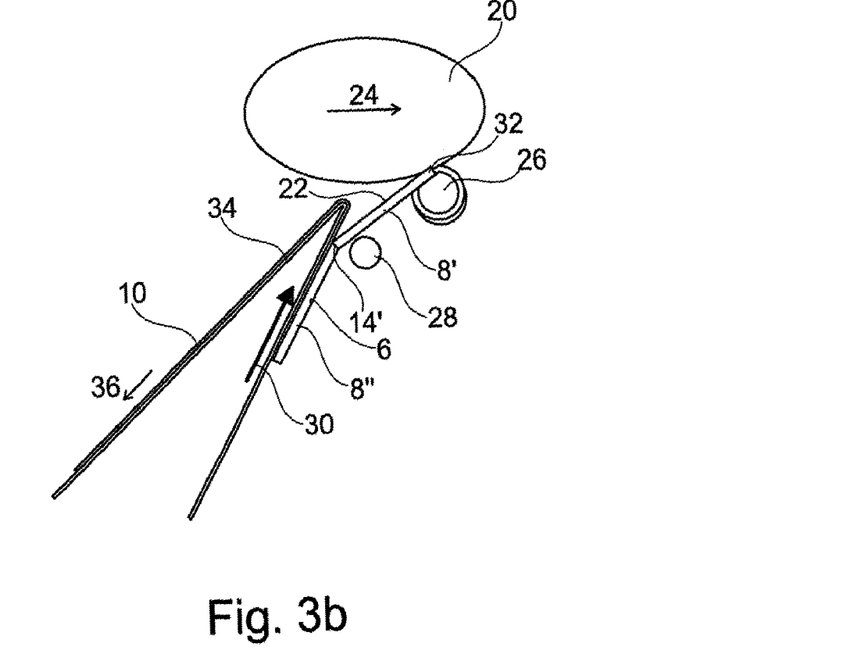
Figure 3C:
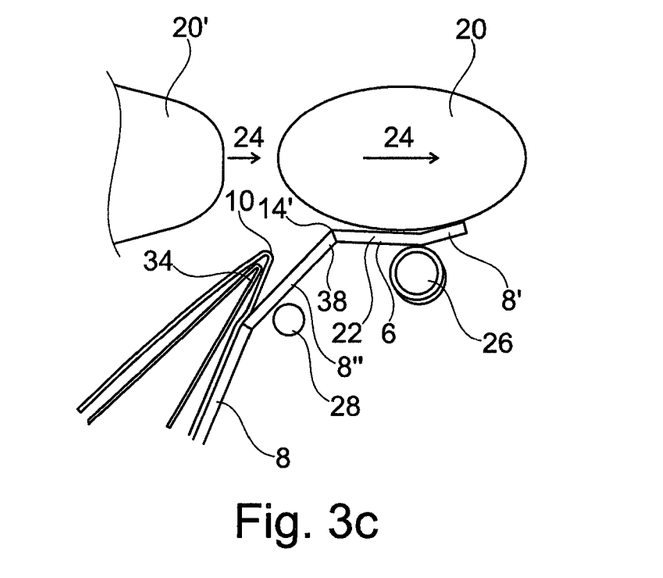
Figure 3D:
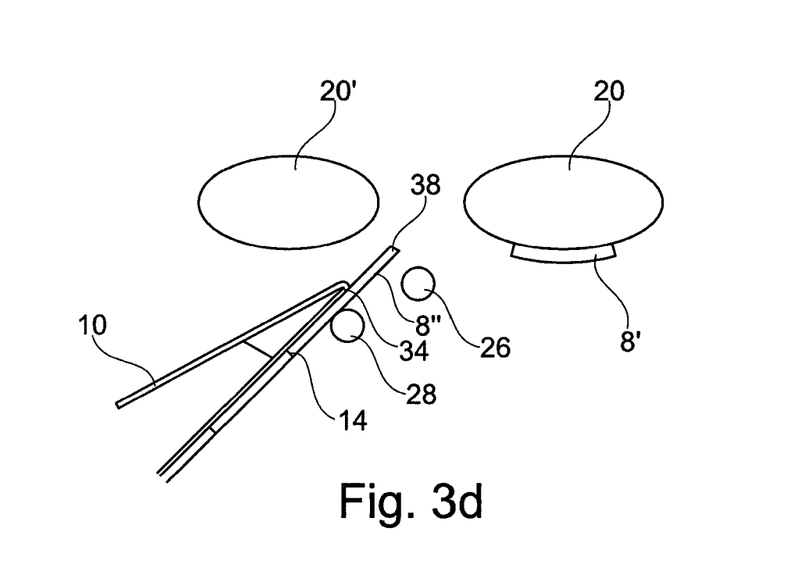

The speed of movement of the label supply is changed during the label application cycle, typically by slowing the same, at or before the leading edge portion 32 of the label and the article make first contact. In one embodiment the contact is encouraged by the provision of a press down or nip roller 26 which is located at the application point and which causes the article and label to apply together.

Typically, the leading label 8' is joined by the line of weakening 14 (which is typically formed by micro-perforations) to the following label 8" in a manner which ensures that the separation force required to remove the leading label 8' from the backing layer 10 is less than the force required to break the line of weakening 14 and therefore avoids the line of weakening breaking prematurely during the application cycle for the leading label to the article.

The method of the invention therefore means that the leading label is positioned such that when the leading edge portion 32 of the same is attached to the article, the leading label is thereafter moved consistently and automatically along with the article.

FIGS. 3a-d illustrate the application point 22 of the apparatus of FIG. 1 in greater detail. In FIG. 3a the article 20 is shown moving in the direction of arrow 24. A press down roller or brush 26 is provided in order to encourage the contact between the free portion 32 of the leading label 8' and the article 20 in a manner which will subsequently be described.

A guide 28 can be provided to limit the label sheet material of the supply of labels 2 lifting from the backing layer 10 prematurely and thereby retain the high shear strength of the supply of labels 2. As shown, the label sheet material 6 has a series of labels 8 formed therein, including the leading label 8' with the adjacent labels joined by respective lines of weakening 14 formed by a pattern of micro perforation ties. The supply of labels is moved in the direction of arrow 30 and the leading label 8' has a leading edge 32 which is positioned in advance of an applicator beak or peel plate 34 which is offset by distance X from the application point 22 of the article and leading edge 32 of the leading label 8'.

The backing layer 10, once the label 8' is removed therefrom, is moved to the waste collection roll 16 in the direction of arrow 36.

Thus, at the first step shown in FIG. 3a, the leading edge 32 and leading label 8' are shown in position for that label to be applied to the article 20 and it is shown how the leading edge 32 is positioned in a pre-dispensing position in advance, or downstream, of the beak or peel plate 34. In practice. the leading edge 32 may be deflected by the moving article 20 before or after the supply of labels is fed forwards by the label supply movement control system as part of the label application cycle.

FIG. 3b illustrates how the sheet material 6 in which the labels 8 are formed is fed forward in the direction of arrow 30 as the article 20 passes the application point 22 in the direction of arrow 24. The leading edge 32 of the leading label 8' is pressed to the article 20 in the correct position and, when provided, the guide 28 prevents or limits the lifting of the leading label 8' when applied to the article from the backing layer 10 in order to retain the shear resistance. The lifting of the leading label from the backing layer is typically limited as the supply of labels moves in the application cycle until the line of weakening 14' connecting the leading label 8' to the following label 8 passes over the beak or peel plate 34 and which assists in the release of the leading label 8'. Thus, in this embodiment it is the control of the movement of supply of labels 2 which sets the final stop position of the supply of labels 2 during the application cycle.

Figure 5:
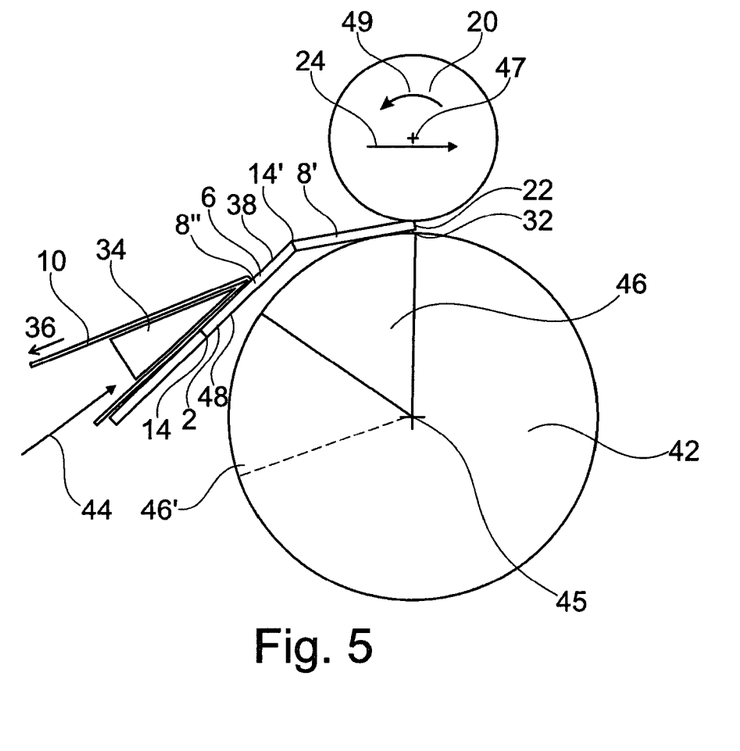
FIG. 5 illustrates the application of a leading label from a label supply using the apparatus of FIG. 4.

In FIG. 3c the leading label 8' has been fully removed from the backing layer material 10 and the leading label has now been firmly applied to the article 20. Also, the leading edge portion 38 of the next label which is now the new leading label 8", has been removed from the backing layer 10. At this stage of the application cycle for the leading label 8' the speed of movement of the supply of labels 2 is decelerated, possibly to stop, to induce tension in the sheet material 6 in which the labels are formed, as the article is still being moved, and the aim is to induce tension in particular in that part of the sheet material 6 which has now been removed from the backing layer 10. This speed change is created to induce a break force which is sufficient to cause the ties in the line of weakening 14' to break and hence allow the complete separation of the leading label 8' from the label supply so that the leading label 8' can then be carried on and away by the article 20 as show in FIG. 3d. The leading edge portion 38 of the new leading label 8" is then in the correct position for application to the next container 20'. This also means that the next article to which the label 8" is to be applied contacts the leading edge portion 38 and bends the same away from the beak 34 so that when the label feed is pushed towards the application point 22 the leading label edge portion 32 is moved to contact with the article relatively close to the press down roller 26 and the roller is close enough such that the trailing portion of the leading label is still at this stage in contact with the backing layer and so the strength of the backing layer in combination with the trailing portion of the leading label is retained at this stage of application until the article is further moved and a greater part of the leading portion of the leading label is attached thereto, whereupon the backing layer is removed from the trailing portion of the leading label and the line of weakening then broken to release the leading label from the label supply. This process is then repeated for successive labels FIGS. 4 and 5 illustrate a further embodiment of the invention. In this case the application apparatus includes a rotary drum 42 towards which the supply of labels is moved such that the leading edge 32 of the leading label 8' is moved into position between the outer surface of the drum and the article 20 which is being moved in direction 24. The drum rotates about the axis 45 during the application cycle. The article 20 arrives to the application point 22 on a rotary platform (not shown) which is moving in direction 24 and at the same time the platform, and hence article thereon, rotates at a predefined speed about axis 47 as indicated by arrow 49. The supply of labels 2 is fed at a fixed consumption speed or a rhythmic consumption speed during the label application cycle in the direction of arrow 44 past the application beak 34 at which the backing layer 10 is separated from the sheet metrical 6 in the which the labels are formed. Typically the speed of rotation of the drum is the same as the speed of rotation of the article 20 and platform on which it is located. For the application cycle for the leading label 8' to the article 20 a sector 46 of the drum acts on the label. The sector has an outer surface with air holes and in which sector a vacuum is drawn through the air holes. For the application of the following label 8" the airholes of the next sector 46' of the drum will have the vacuum pulled therethrough when that sector is in the application position, and so on for the application of subsequent labels.

In a preferred embodiment the sheet material 6 in which the labels are formed is released continuously from the beak with the non-adhesive side 48 of the label sheet material assisted in this separation by the draw of the vacuum from the drum sector 46 and the ties of the micro-perforations joining one label to the next carried on the liner. The leading portion 32 of the leading label 8' reaches the application point 22 where it is nipped between the rotating drum 42 and the moving article 20 as shown. At this same point the vacuum sector ends 46 so that the leading label 8' is free to tack to the article and the continued movement induces the tension required in the sheet material 6 in which the labels are formed to cause the separation of the line of weakening 14' to free the leading label and with the leading edge 38 of the new leading label 8" continuing to advance to the application point 22 at a lower speed.

The invention therefore eliminates the need for total separation of each label on the backing layer and, instead allows the label supply to be continuous with the adjacent label joined via lines of weakening, typically formed by slits and ties with the ties having sufficient retained strength in terms of their size and/or number so as to effectively pull the leading label off the backing layer at the beak or plate 34 point and enhance the separation of the next label without the rigidity or stiffness of the material which is normally required. Typically, when the leading edge of the following label which is still joined to the leading label being applied, is released from the backing layer at the peel plate the movement of the label supply is at or near to a deceleration to stop phase. Tension is therefore induced into the label sheet material by the attachment of the leading portion of the leading label, preferably in a nipped contact with the article surface by a pressure roller or similar device.

The article, in one embodiment, is moved at a higher speed such that this increase in tension causes the line of weakening between the leading label and the following label to break and hence release the leading label for full contact with and adherence to the article.

The invention claimed is:

1. A method for the automated application of labels successively from a backing layer onto successive articles, said method comprising:
   feeding a supply of labels defined by a first sheet material, which is adhered to the backing layer of sheet material, towards an application point, said labels in said supply of labels joined to adjacent labels in the supply by a line of weakening and a first, leading, label is directly connected to a following label by a line of weakening, wherein the lines of weakening between the respective labels remain intact as the first sheet material and backing layer are advanced towards the application point and
   wherein, to apply the leading label to a said article the backing layer is detached from a leading portion of the leading label and said leading portion is applied to the said article and a strength of the line of weakening is provided to be such that the line of weakening between the first, leading label and the following label remains intact until a remainder of the leading label is released from the backing layer and the retention strength of the said lines of weakening between respective adjacent labels in the label supply is greater than the adhesive strength of the first sheet material to the backing layer of sheet material, such that the force required to break the line of weakening is greater than the force required to detach the first sheet material from the backing layer sheet material,
   wherein the said line of weakening is formed by a pattern of ties which extend between the trailing edge of one label and the leading edge of the adjacent label such that when the leading label is separated from the following label to allow the leading label to be applied to the article, the leading edge of the following label is formed, and
   wherein the supply of labels passes an application beak which is offset from the application point of the leading edge of the leading label and the article and which application point is located downstream of the application beak, intermediate the application beak and the article and the backing layer is separated from the first sheet material in which the labels are formed, at the application beak,
   said supply of labels advanced towards the application point in a first direction and said article advanced towards the application point in a second direction, different to said first direction, and
   wherein said advancement of said supply of labels in said first direction to the said application beak occurs with the supply of labels formed by the first sheet material adhered to the backing layer of sheet material, and said advancement between the application beak and the application point is maintained for the remaining first sheet material of the supply of labels by the retention of the lines of weakening between said adjacent labels in the supply of labels.

2. A method according to claim 1 wherein as the leading label is released from the backing layer, the same is applied to the article.

3. A method according to claim 1 wherein force required to break the line of weakening is greater than force required to detach the label supply from the backing layer.

4. A method according to claim 1 wherein the strength of the line of weakening is less than a straight line shear force of a label following the leading label.

5. A method according to claim 1 wherein speed of application of the labels is defined by a speed of movement of the articles to which the labels are applied.

6. A method according to claim 5 wherein a speed of the feed of the supply of labels is adjusted during the label application cycle to cause release of the leading label from the supply of labels by breaking the line of weakening.

7. A method according to claim 6 wherein a leading edge of the leading label contacts the article to adhere to the same as the speed of movement of the supply of labels is reduced.

8. A method according to claim 6 wherein a reduction in the speed of movement is such as to cause movement of the supply of labels to be temporarily slowed or stopped to create sufficient tension in the label supply to cause the line of weakening between the leading label and the adjacent label to break and release the leading label.

9. A method according to claim 8 wherein the released label is applied fully to the article by continued movement of the article.

10. A method according to claim 1 wherein at least the article is moved continuously during label application stage.

11. A method according to claim 6 wherein movement of the label supply is controlled to allow tension to be created which is sufficient to break the line of weakening once the leading label is brought into contact with the article.

12. A method according to claim 1 wherein a subsequently freed leading edge of the following label is brought to the application point by subsequent movement of the supply of labels and/or initial contact with a next article and to which the following label is to be applied by repeating the application method.

13. A method according to claim 1 wherein a pressing means is provided to cause the leading edge portion of the leading label and the article to be pressed together to move the adhesive of the label into adherence with the article surface.

14. A method according to claim 13 wherein the pressing means enhances creation of a "hump" or loop in the supply of labels following the leading edge portion of the leading label and allow a snap force to be created to cause the line of weakening to break.

15. A method according to claim 13 wherein movement of the label supply is initiated or changed before the leading edge portion of the leading label and a container are pressed together by the pressing means.

16. A method according to claim 1 wherein an ionised air flow is directed onto the supply of labels and/or apparatus adjacent thereto in order to reduce static build up.

17. A method according to claim 1 wherein size and strength of the line of weakening which is created between adjacent labels in a supply of labels is selected from the group consisting with respect to one or more of the parameters of: position of the line of weakening on the label, shape of the label, thickness of material in which the labels are formed and thickness of the backing layer.

18. A method according to claim 1 wherein a vacuum is created at the point of application of the leading label to the article to assist in the separation of the leading label from the supply of labels as it is applied to the article.

19. A method according to claim 1 wherein the label supply is pushed to the point of label application on one or more belts.

20. A method according to claim 1 wherein the label supply is carried to the point of label application on a drum which is mounted for rotation about an axis and the leading label is applied from the drum to the article with the article rotating about a second axis.

21. A method for the automated application of labels successively from a backing layer onto successive articles, said method comprising:
feeding a supply of labels defined by a first sheet material in which the labels are formed and which is adhered to the backing layer, towards an application point, said supply of labels having a first, leading, label directly connected to a following label by a line of weakening;
removing a leading portion of the leading label from the backing layer;
advancing the said removed leading portion to an application point to contact and adhere to a article and thereafter removing the remainder of the leading label from the backing layer; and
breaking the line of weakening to detach the leading label from the label supply and apply the same to the article and wherein the retention strength of the said lines of weakening between respective adjacent labels in the label supply is greater than the adhesive strength of the first sheet material to the backing layer of sheet material, wherein each said line of weakening is formed by a pattern of micro-perforation ties which extend between adjacent labels in the label supply and, when broken, a trailing edge of the leading label and a leading edge of the following label are defined, and wherein the supply of labels passes an application beak which is offset from the application point of the leading edge of the leading label and the article and which application point is located downstream of the application beak, intermediate the application beak and the article and the backing layer is separated from the first sheet material in which the labels are formed, at the application beak, said supply of labels advanced towards the application point in a first direction and said article advanced towards the application point in a second direction, different to said first direction, and wherein said advancement of said supply of labels in said first direction to the said application beak occurs with the supply of labels formed by the first sheet material adhered to the backing layer of sheet material, and said advancement between the application beak and the application point is maintained for the remaining first sheet material of the supply of labels by the retention of the lines of weakening between said adjacent labels in the supply of labels.

22. A method according to claim 21 wherein the method includes the steps of moving the article past the application point and said movement, in combination with controlled movement of the supply of labels, allows detachment of the leading label and application of the leading label to the article.

23. A method according to claim 21 wherein movement of the article is at a substantially continuous speed and movement of the supply of labels is changed during a application cycle for a label from the label supply.

* * * * *